G. & U. ANTONI.
BLADE OR FISH TAIL PROPELLER AND SUBMARINE BOAT.
APPLICATION FILED DEC. 4, 1909.
1,050,090.
Patented Jan. 14, 1913.
3 SHEETS—SHEET 1.
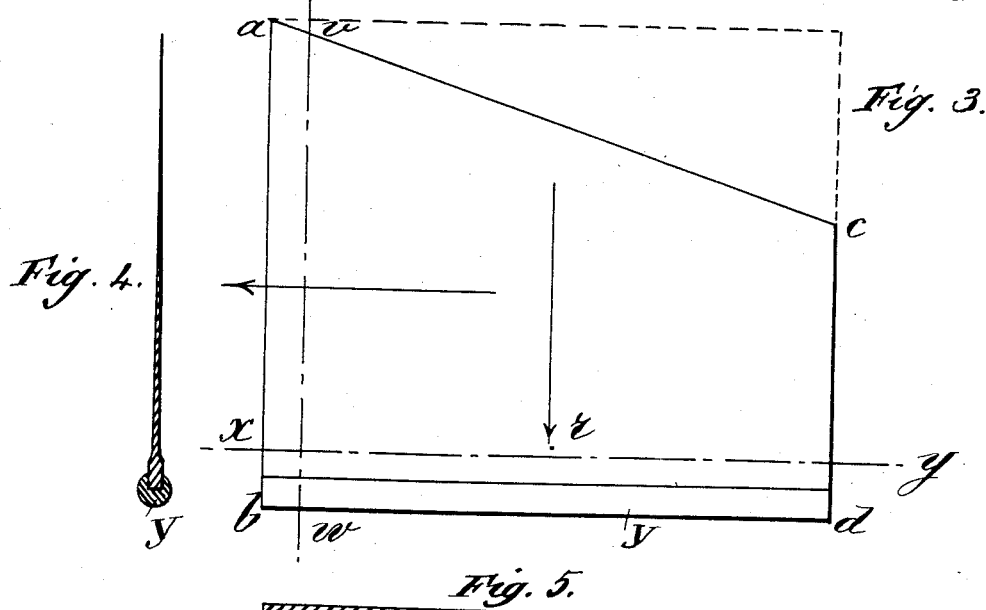
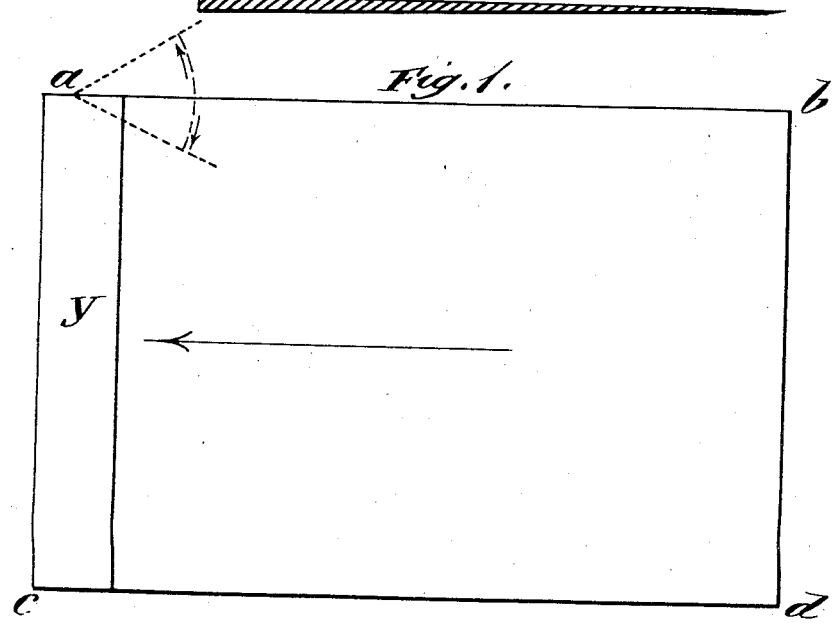
Witnesses:
Ida F. Manley
Eileen R. Heine
Inventors:
Guido Antoni and Ugo Antoni
By Emile Binnegkes
Atty.

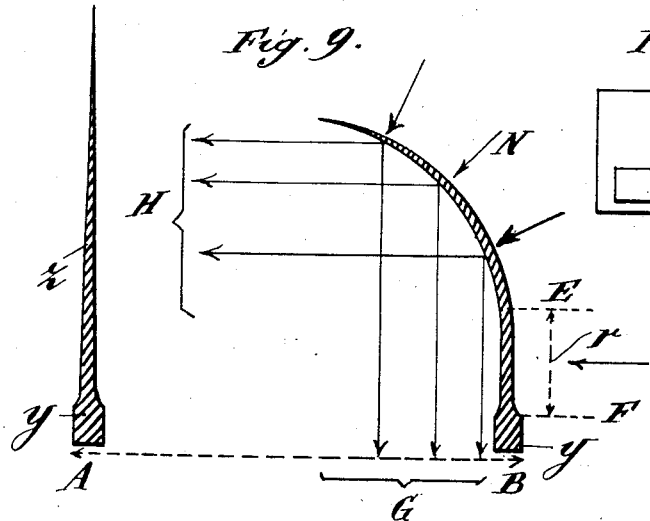
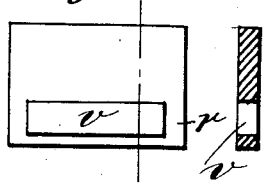
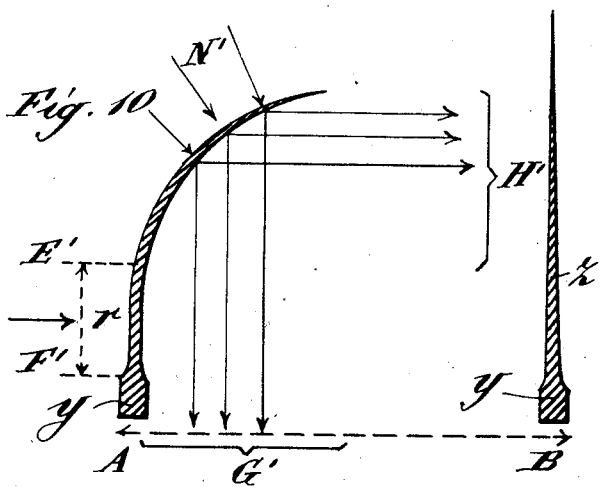
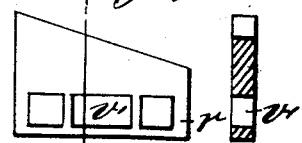
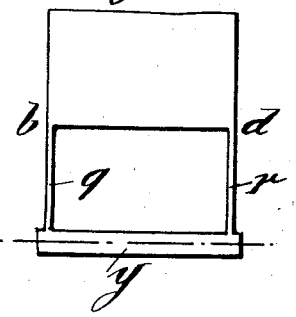

G. & U. ANTONI.
BLADE OR FISH TAIL PROPELLER AND SUBMARINE BOAT.
APPLICATION FILED DEC. 4, 1909.
1,050,090.
Patented Jan. 14, 1913.
3 SHEETS—SHEET 3.
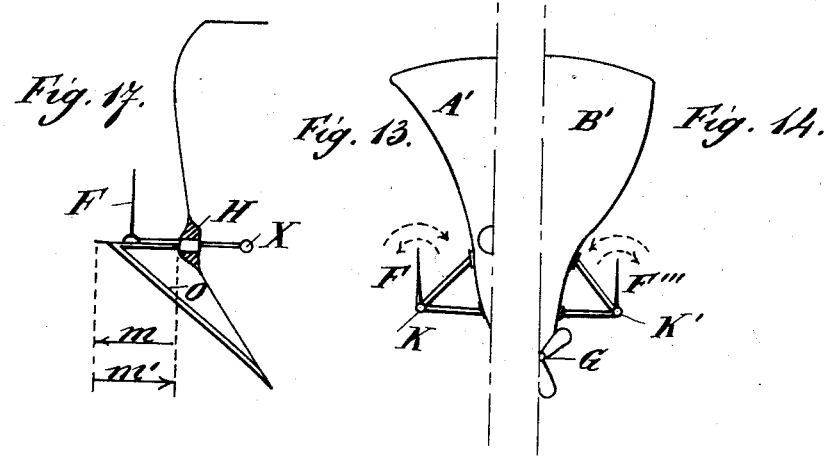
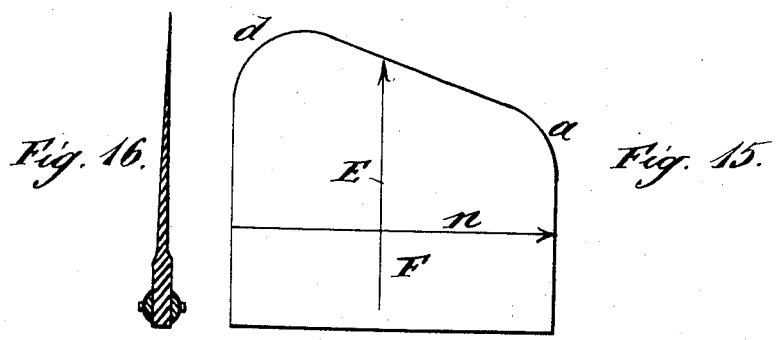
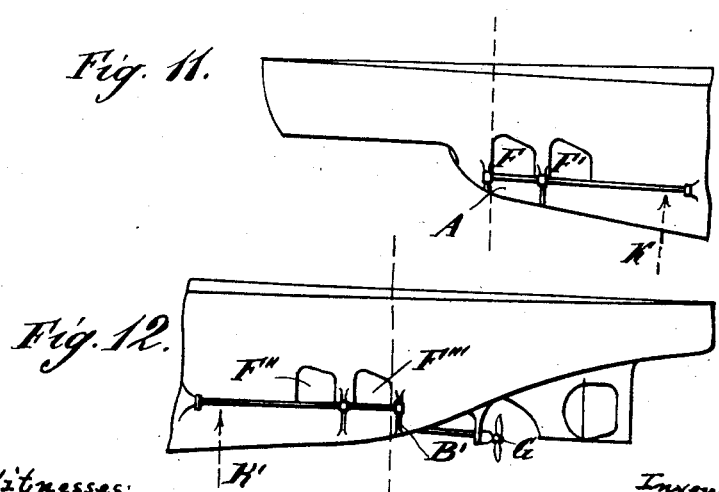
Witnesses:
Ida T. Stanley
Elleone R. Heine
Inventors:
Guido Antoni and Ugo Antoni
By Emil Bonnetzke
Atty.

UNITED STATES PATENT OFFICE.

GUIDO ANTONI AND UGO ANTONI, OF PISA, ITALY.

BLADE OR FISH-TAIL PROPELLER AND SUBMARINE BOAT.

1,050,090.  Specification of Letters Patent.  Patented Jan. 14, 1913.

Application filed December 4, 1909. Serial No. 531,374.

*To all whom it may concern:*

Be it known that we, GUIDO ANTONI, draftsman, and UGO ANTONI, employee, both subjects of the King of Italy, residing at No. 2 Via S. Frediano, Pisa, in the Kingdom of Italy, have invented new and useful Improvements in Blade or Fish-Tail Propellers and Submarine Boats, of which the following is a specification.
The present invention refers to improvements in the form of the blade or fish-tail propellers adapted to vibrate to and fro through an arc of a circle, such improvements being intended to increase their efficiency.

It also refers to a particular kind of motion which may be imparted to them and also to the means for imparting such motion, and for enabling said blade or fish-tail propellers to be availed of for sinking submarine boats.

The invention will be hereinafter described with reference to the accompanying drawings, of which—
Figure 1 is a side view of our improved propeller adapted to oscillate on a vertical shaft as is the case when it has to impart to the vessel a horizontal motion, Fig. 2 is a horizontal section of Fig. 1, Fig. 3 is a side view of our propeller adapted to oscillate on a horizontal axis, as is the case when it is employed for sinking a boat. Fig. 4 is a section on line *v—w* of Fig. 3; Fig. 5 is a section on line *x—y* of Fig. 3; Figs. 6, 7, 8 are diagrammatic side views showing modified forms of the blade propeller Fig. 3. Figs. 9 and 10 are diagrammatic views intended to show the effect obtained by imparting to the blade propeller a to and fro horizontal motion instead of the usual vibrating or oscillating motion. Figs. 11 and 12 are side views respectively of the bow and of the stern of a submarine boat provided with a screw propeller for horizontal displacement and our blade propellers for displacement in vertical direction. Figs. 13 and 14 are front views respectively of Figs. 11 and 12; Figs. 15 and 16 are detail views of our blade propellers as actually applied to submarine boats. Fig. 17 is a view showing the application to our propeller blade mounted on a submarine boat of a to and fro motion of translation instead of the to and fro rotary motion, and Fig. 18 is an enlarged sectional view similar to Fig. 2, showing the parabolic outline of the propeller blade with the plot-lines dotted in.

According to Figs. 1 and 2 concerning a blade propeller intended for the propulsion in horizontal direction and where the arrow shows the direction of the forward movement of the boat, the oscillating blade *a b c d* oscillates through an arc of a circle on the shaft *y* and tapers from its forward toward its rear end, the section (Fig. 2) being limited on both sides by a parabolic outline.

The oscillating blade shown in Figs. 3 to 5 is applicable to a boat moving in horizontal direction (see the horizontal arrow Fig. 3) under the action of a propeller of whatever description, the circular oscillation of the blade on the shaft *y* adjacent to the lowermost edge *b d* of the blade being intended to sink the boat as shown by the vertical arrow Fig. 3. The vertical section on line *v w* of Fig. 3, illustrated in Fig. 4 tapers from the lowermost edge *b d* toward the uppermost edge *a c* and is limited by a parabolic line on both sides. The section on line *x y* of Fig. 3, illustrated in Fig. 5 also tapers from the forward or leading edge *a b* toward the rear or following edge *c d*. The latter is preferably much shorter than the former the blade thus having the form of a rectangular trapezoid whose parallel vertical sides are perpendicular to the axis of oscillation.

In the case of our oscillating blades being employed for the purpose of sinking submarine boats the greater thickness thereof in proximity to the leading edge *a b* (see Figs. 3 and 5) is intended to withstand the resistance of the surrounding water to the displacement in horizontal direction, obtained by means of a screw or any other description of propeller. The tapering from the lowermost edge *b d* toward the uppermost *a c* is directed to insure a high degree of flexibility. The inspection of Figs. 9 and 10 shows that the greater the deflection of the blade, the greater is the resultant of the vertical components G of the normal pressures N of the surrounding medium against the surface of the blades; and it is to the resultant of such vertical components, which are directed downwardly that the sinking of the boat is due.

The contour of the blades may be either rectangular as shown Fig. 1, or trapezoidal as shown Fig. 2, both the rectangular and trapezoidal blades preferably having rounded edges as shown Fig. 15 with respect to the trapezoidal blade. The inspection of Figs. 9 and 10 also shows that the part $r$ of the blade comprised between E and F or E' and F' respectively, which is placed in proximity of the axis of oscillation contributes in a very small measure to the vertical downwardly directed components G to which alone the sinking of the vessel is due, while its resistance against horizontal propulsion is by no means negligible. It is therefore sometimes advisable in order to raise the efficiency of our blade propellers to partly remove said zone $r$ by providing the blades with a lengthy port or hollow recess $v$ (Fig. 6) or with several recesses $v'$ (Fig. 7) or even by not mounting the blades in proximity of the oscillation axis $y$ but at the outer end of a parallelogram formed by the axis of oscillation $y$, the lowermost edge $b\ d$ of the blade and the two parallel rods $q, r$ (see Fig. 8). The resistance of the part $r$ is thereby annulled, the water being at liberty to flow through said recesses.

Instead of causing the propeller blade to oscillate to and fro through an arc of a circle it may prove advantageous to impart to the whole system consisting of the blade and its axis $y$ (Figs. 9 and 10) a to and fro motion of translation along a rectilinear path. The blade $z$ moving from A to B (Fig. 9) would then be deflected as shown at the right at this figure; the group of the normal resisting forces N producing said deflection would be decomposed into two groups of components namely the horizontal components H and the vertical components G. The same would be the case with the resisting forces N' the horizontal components H' and the vertical components G' with respect to the return motion from B to A (Fig. 10.)

Owing to the quick to and fro motion the groups of forces H and H' would annul each other, while the downwardly directed components G and G' would be thoroughly utilized for the purpose of sinking the vessel. By the adoption of the alternating rectilinear motion instead of the vibrating motion through an arc of circle, the following advantages are obtained: 1st, the direction of the components to which the propulsion in the desired direction is due (the downward direction in the case of a submarine boat) remains always unchanged while it continuously varies during the circular motion. 2nd, the resistance offered by the blade to propulsion in the desired direction, and also the resistance to sinking, are much smaller, the blades always remaining in a vertical position, than in the case of the oscillating blades when they must take positions inclined to the vertical.

A' (Fig. 11) is by way of example the bow and B' Fig. 12 is the stern of a submarine boat propelled in horizontal direction by the screw G and provided for instance with four fish-tail blades F F' F'' F''' on one side and as many on the other side of the vessel for the purpose of sinking.

The blades are shown in detail, Figs. 15 and 16. They are of the trapezoidal form with rounded corners at the top namely at $d$ and $a$ and they taper in thickness in the direction of the arrow $n$ from the leading toward the following edge as well as in the direction of the arrow E namely from the lowermost toward the uppermost edge. The blades are mounted on the shafts K K', which receive a to and fro motion through an arc of a circle as shown in Figs. 13 and 14.

Fig. 17 shows how a to and fro rectilinear motion, in the direction of the arrows $m$ and $m'$ alternately, may be imparted to the propeller blade F by means of a rod actuated at its inside end X by a proper mechanism, going through the wall of the vessel at H and sliding outwardly on a projecting bracket O.

Having thus described our invention and how the same is to be carried into practice, what we desire to protect by Letters Patent is:

1. A fish-tail propeller blade having its cross-section tapered in opposite parabolic curves.

2. A flexible blade propeller whose sections, perpendicular to each other, are both tapering, the faces of the propeller in the direction of one section being limited by a parabolic contour.

3. A rectangular flexible blade propeller whose sections, perpendicular to each other, are both tapering, the faces of the propeller in the direction of one section being limited by a parabolic contour.

4. A trapezoidal flexible blade propeller whose sections, perpendicular to each other, are both tapering, the faces of the blade in the direction of one section being limited by a parabolic contour.

5. A rectangular flexible blade propeller with rounded outer corners whose sections, perpendicular to each other, are both tapering, the faces of the blade along one section being limited by a symmetrical parabolic contour.

6. A trapezoidal flexible blade propeller with rounded outer corners whose sections perpendicular to each other, are both tapering, the faces of the blade along one section being limited by a parabolic contour.

7. A rectangular flexible blade propeller whose sections, perpendicular to each other, are both tapering the faces of the blade along one section being limited by a parabolic contour, the blade being provided with a port or ports in proximity to the inner edge.

8. A trapezoidal flexible blade propeller whose sections, perpendicular to each other, are both tapering, the faces of the blade in the direction of one section being limited by a parabolic contour, the blade being provided with a port or ports in proximity to the inner edge.

9. A rectangular flexible blade propeller with rounded outer corners whose sections, perpendicular to each other, are both tapering, the faces of the blade along one section being limited by a parabolic contour, the blade being provided with a port or ports in proximity to the inner edge.

10. A trapezoidal flexible blade propeller with rounded outer edges whose sections, perpendicular to each other, are both tapering, the faces of the blade in the direction of one section being limited by a parabolic contour, the blade being provided with a port or ports in proximity of the inner edge.

11. A propeller, comprising a flexible blade having its sections tapered to reduce the thickness of the blade in opposite parabolic curves from its base to its outer edge, and having its sections tapered from front to rear in straight lines.

12. A propeller comprising a flexible blade having its faces converging in parabolic curves from the base to the top of the blade and having its faces converging in straight lines from front to rear, and the top edge of said blade being inclined from front to rear toward the base.

In testimony whereof we hereunto affix our signatures in the presence of two witnesses.

GUIDO ANTONI.
UGO ANTONI.

Witnesses:
GILIPPA HOMER,
FALIO NEIL.